Feb. 19, 1924. Re. 15,774
F. SCHOENWOLF
TELEPHONE SYSTEM WITH AUTOMATIC RINGING DISCONNECT
Original Filed Nov. 27, 1914
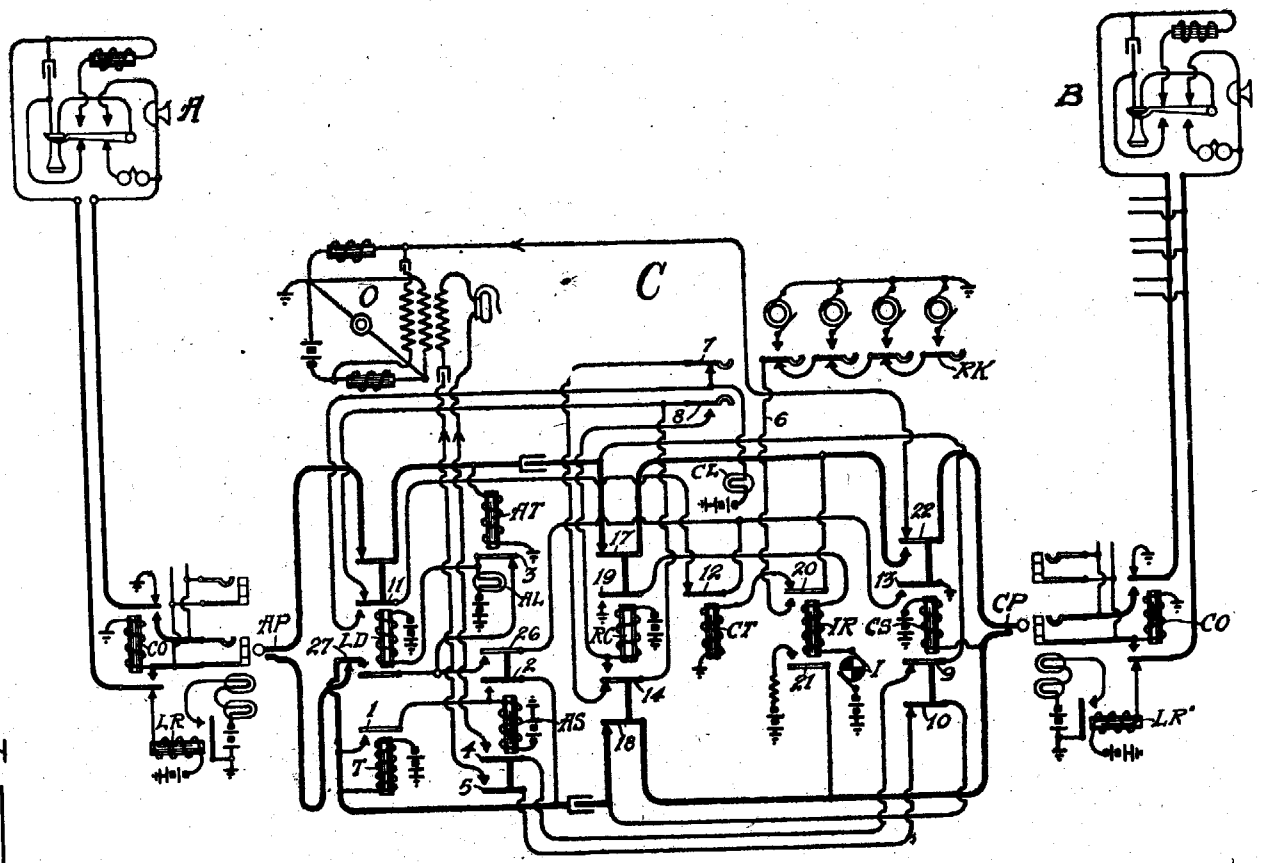
Inventor:
Fred Schoenwolf.
By Curtis, Camp.
Attorney.

Reissued Feb. 19, 1924. Re. 15,774

UNITED STATES PATENT OFFICE.

FRED SCHOENWOLF, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

TELEPHONE SYSTEM WITH AUTOMATIC RINGING DISCONNECT.

Original No. 1,273,189, dated July 23, 1918, Serial No. 874,163, filed November 27, 1914. Application for reissue filed March 1, 1920. Serial No. 362,557.

*To all whom it may concern:*

Be it known that I, FRED SCHOENWOLF, a citizen of the United States of America, resident of Chicago, county of Cook, and State of Illinois, have invented certain new and useful Improvements in Telephone Systems with Automatic Ringing Disconnect, of which the following is a specification.

My invention relates to telephone systems and has to do more particularly with automatic ringing systems such as are provided for operators' cord circuits; one of the principal objects of my invention being to provide an improved circuit arrangement whereby the application of ringing current to the called line is interrupted and a disconnect signal given, should the calling subscriber replace his receiver prior to receiving a response from the called substation.

In the accompanying drawing I have illustrated the preferred embodiment of my invention, the system shown including calling and called substations A and B, respectively, each terminating in line circuits having the usual line relay LR, cut-off relay CO and line jacks. The line circuits shown are what are known as multiple lamp circuits, in which a line lamp is provided for each jack so that when a call is initiated, a line signal appears before each of the calling line jacks and any one of a plurality of operators may seize this call preferably to the exclusion of others.

The preferred form of cord circuit C is arranged for interconnecting the telephone lines and includes an answering plug AP and calling plug CP, connected by talking conductors indicated by heavily marked lines. In answering a call, an operator inserts an answering plug AP into a line jack, whereby the high resistance test relay T is energized to connect the answering supervisory relay AS in circuit with the cut-off relay CO so that relay AS is energized and connects the operator's telephone O in circuit with the cord and thus with calling line. The answering tip relay AT also energizes to prevent the premature lighting of the answering supervisory lamp AL. In extending the call to the wanted line, the operator inserts the calling plug CP whereby the calling sleeve relay CS energizes to again disconnect the operator's telephone from the cord circuit. The operator then depresses the proper plunger of the ringing key RK, which connects the proper ringing generator by the common contacts of the key, causes an energization of a ringing control relay RC followed by the periodic energizations of an interrupter relay IR by a circuit through the interrupter I. When the subscriber responds to the call, a calling tip relay CT energizes, interrupting the locking circuit for the ringing control relay RC to stop further application of ringing current and efface the calling supervisory lamp CL.

Should the calling subscriber replace his receiver prior to the response of the called subscriber, link disconnect relay LD energizes, and in view of the fact that the locking circuit for the ringing control relay RC is controlled through contacts of relay LD, the ringing control relay de-energizes and prevents further application of ringing current to the called line.

The energization of relay LD also interrupts the link or cord talking conductors and thereby restores the control of the line circuit to substation A so that the subscriber thereat may immediately recall without awaiting the withdrawal of the answering plug AP. Although the preferred embodiment of my invention includes this instantaneous disconnect and recall, it is to be understood that my invention is not limited to circuits employing this method of operation.

Having described in general the different devices employed in the prefered embodiment of my invention and their functions, I will now describe more in detail the operation of the system shown.

A subscriber at substation A desiring to call, removes his receiver to establish a circuit for the corresponding line relay LR, whereby the line signals before the different associated jacks are lighted. The first operator to seize the call by the insertion of an answering plug AP in one of the calling line jacks, connects high resistance test relay T and cut-off relay CO in series, effecting the energization of T. The closing of alternate contact 1 of relay T connects the comparatively low resistance answering sleeve relay AS in series with cut-off relay CO, whereby relay AS energizes, closing its alternate contact 2 to connect its winding directly to the sleeve strand of the cord independent of the contact of the test relay. Therefore, should relay T restore due to the shunting of its winding by the comparatively low resistance of AS, relay AS still remains energized through its locking contact 2. Due to the flow of current through the windings of AS and T over the calling line and through the answering tip relay AT, said relay AT energizes to interrupt its normal contact 3 and prevent a premature lighting of the answering supervisory lamp AL and premature energization of the link disconnect relay LD. Also responsive to energization of AS, its alternate contacts 4, 5 are closed to connect the operator's telephone O in bridge of the talking conductors of the cord and thus to the calling telephone line.

Should a second operator insert a plug AP into another jack of the calling line subsequent to the insertion of the first plug, the test relay T of this second cord does not energize due to the shunting of its winding by the relay AS of the first cord so that the second operator is unable to communicate with the calling subscriber because her telephone set is not connected. Therefore, this second operator again withdraws her answering plug AP.

The first operator having ascertained that connection is desired with substation B tests a jack thereof in the usual manner and, finding the line idle, inserts the calling plug CP in a jack thereof. This act connects calling sleeve relay CS and cut-off relay CO′ in series, causing their energization, the energization of CO′ removing the substation control of its line signals and extending the connected jack and cord to the called line. The energization of CS, by interrupting its normal contacts 9, 10, again disconnects the operator's telephone from the cord. The operator now depresses the proper plunger by ringing key RK, whereby the associated generator is connected to the ringing conductor 6. The actuation of the ringing plunger to its fully depressed position also actuates the common contacts 7, 8 which are closed while the plunger is fully depressed but not when in its intermediate position. The closing of alternate contact 8 establishes a circuit for ringing control relay RC, traced from battery through the winding thereof, alternate contact 8, normal contacts 11, 12 and alternate contact 13, to ground. Relay RC, therefore, energizes, closing its alternate contact 14 to establish a direct locking circuit for its winding through normal contact 11 and 12 and alternate contact 13 to ground.

It will be noted that the locking circuit for ringing control relay RC is traced through normally closed contacts of relays LD and CT, thereby placing the disconnection of ringing current under control of both the calling and called substations, as will be described.

Relay RC having energized, interrupts its normal contacts 17, 18 to interrupt the talking strand and closes its alternate contact 19 to establish an operating circuit for interrupter relay IR through interrupter I. Relay IR is, therefore, periodically energized to alternately connect ringing current and tip relay CT in circuit with the called line by action of its contacts 20, 21.

Upon response of the called subscriber and the first following de-energization of IR, a circuit for tip relay CT is established, traced from ground through the winding thereof, normal contact 20, alternate contact 22, over the line and returning through the winding of CS to battery. The resulting energization of CT effects an interruption of its normal contact 12 which, it will be remembered, is included in the locking circuit of RC. Therefore, relay RC de-energizes, opening its alternate contact 19 and maintaining the interrupter relay IR inert. The closing of the normal contacts 17, 18 establishes the continuity of the talking circuit between the two substations.

Assuming now that the connection has been extended to the called line and that its substation was being rung, as before described, but that the calling subscriber replaces his receiver prior to receiving a response from the called substation. In such case the circuit for answering tip relay AT is interrupted, causing its restoration whereby a circuit for link disconnect relay LD and supervisory lamps AL, CL is established. The circuit for relay LD is established from battery through winding thereof, normal contact 3 and alternate contacts 26, 13 to ground. Relay LD, therefore, energizes to interrupt the talking conductors of the link and thereby operatively disconnect the link from the calling line. Although this energization of LD interrupts the initial energizing circuit for AS and T by the opening of normal contacts 27, said relays AS and T are maintained energized through alternate contact 27 to ground over contacts 26, 13. The ground connection from alternate contact 13 to normal contact 3, previously traced, is also effective to light supervisory lamp AL and the closing of alternate contact 11 of relay LD lights calling supervisory lamp CL over a circuit traced from battery through CL, alternate contact 11, normal contact 12 to ground at alternate contact 13. The operator having observed the two signals AL and CL lighted, withdraws plugs AP and CP from their respective jacks, the withdrawal of plug CP causing the restoration of relay CS whereby its alternate contact 13 is interrupted. As relays LD, T and AS are held up over a circuit through this alternate contact 13, it will be seen that they are restored when said contact is interrupted.

It will be observed that when the subscriber A replaced his receiver prior to receiving a response from the called substation and relay LD energized to operatively disconnect the cord from the calling line, cut-off relay CO thereof restored so that the line of substation A was available for immediate recall. Therefore, if the subscriber at substation A desires to initiate a recall without awaiting the removal of plug AP from its jack, by again removing the receiver, line relay LR is energized to light the associated line signals so that the same or another operator may take the call.

When a connection has been effected between substations A and B in a manner as above described and both receivers are off their switch-hooks, establishing a conversational circuit, the replacing of these receivers will light supervisory lamps AL and CL. Assuming the subscriber at B is the first to replace his receiver, the circuit for relay CT is interrupted, causing the closure of its normal contact 12 and establishing a circuit for lamp CL from ground at alternate contact 13 of CS, normal contacts 12, 11, 14, 7 and lamp CL to battery. The replacing of the receiver at substation A causes the deenergization of AT followed by the energization of LD and the lighting of lamp AL, as already described. The operator will now withdraw the two plugs, restoring the apparatus to normal.

It will be noted that relay LD is a slow restoring type, this being to prevent the seizing of a recall by more than one link circuit; that is, assuming a connection is established between substations A and B and that after conversation the subscribers have replaced their receivers to bring about the lighting of lamps AL and CL and the energization of LD. Should the calling subscriber at A initiate a recall prior to the removal of plug AP, the associated line signals will, of course, be lighted, and should another operator than the one which controls cord C seize this call, upon the withdrawal of plug CP of C the locking circuit for relays LD, T and AS is interrupted at alternate contact 13 of CS. Now, if relays LD, T and AS were fast relays and relay LD should restore prior to T and AS, it will be seen that, due to the closing of normal contact 27 of LD, relay AS would remain locked up over the sleeve strand and, therefore, the operator of cord C would have her telephone connected to the calling line in multiple with the telephone of the other operator who has seized the recall. But, due to the slowness of relay LD, relays AS and T will restore prior to LD, so that upon restoration of LD, the associated relay T will not again energize and, therefore, its relay AS also remains inert and the operator at C is prevented from coming in on the seized recall.

From the foregoing, it will be seen that I have provided a system wherein secret service and instantaneous disconnnect and recall are provided, together with automatic ringing which, when applied to a called line, may be interrupted by a control exercised from either connected substation, together with means for establishing the usual disconnect signal of two supervisory lamps.

In working out my invention, I have applied it to a preferred form of cord or link circuit, but I contemplate using it in connection with other circuits than that shown. It will also be apparent that changes and modifications will readily occur to those skilled in the art after becoming familiar with my invention and, therefore, I do not desire to be limited to the exact structure as shown and described, but aim to cover all that which comes within the spirit and scope of the appended claims.

What I claim as new and desire to secure by United States Letters Patent, is:

1. A telephone system comprising telephone lines terminating in multiple jacks, an operator's link circuit provided with plugs for interconnecting said lines via said multiple jacks, operator-controlled means for applying ringing current and continuing such application to the called line, means for interrupting such application of ringing current by a control exercised at both the calling and called substations, and means included in said last means and controlled solely by the calling subscriber, while said link circuit is interconnecting said lines, for freeing the calling subscriber's line from said link circuit.

2. A telephone system comprising telephone lines terminating in multiple jacks, an operator's link circuit having manually controlled connection terminals for interconnecting said lines via said multiple jacks, answering and calling supervisory relays for said link circuit operable over the telephone lines, means for applying ringing current and continuing such application to the called line, operator-controlled means for initiating the operation of said means, means controlled by both supervisory relays for interrupting said application of ringing current, and a relay included in said last means and controlled solely over the calling line for automatically freeing said calling line from said link circuit while a physical connection between said calling line and said link circuit still exists.

3. A telephone system comprising telephone lines terminating in multiple terminals, a manually operated operator's link circuit provided with manually operated connection terminals for interconnecting said lines via said multiple terminals, a relay at each end of the link circuit operable over the telephone line connected at that end, means for applying ringing current and continuing such application to the called line, operator-controlled means for initiating the operation of said means, circuit connections including contacts of both of said relays whereby said application of ringing current may be interrupted by a control exercised at both the calling and called substations, and automatic means for freeing the calling subscriber's line from said link circuit while a physical connection remains between said link circuit and said lines.

4. A telephone system comprising telephone lines, an operator's link circuit for interconnecting said lines, means for applying ringing current and continuing such application to the called line, a pair of supervisory signals for the link circuit, and means controlled over the calling line for interrupting such application of ringing current to the called line and lighting said supervisory signals for disconnection, said last means also adapted to free the calling line from said link circuit although a physical connection remains between said link circuit and said calling line.

5. A telephone system comprising telephone lines terminating in multiple jacks, an operator's link circuit provided with plugs for interconnecting said lines via said multiple jacks, means for intermittently applying ringing current to the called line, operator-controlled means for initiating the operation of said ringing means, means controlled by either the calling or the called subscriber for disconnecting the ringing current from the called subscriber's line and automatic means controlled solely by the calling subscriber when said link circuit is interconnecting said lines for freeing said calling line from said link circuit.

6. A telephone system comprising a calling subscriber's and a called subscriber's line terminating in multiple jacks, an operator's link circuit having manually operated connection terminals for connecting said lines via said multiple jacks, operator-controlled means for applying ringing current to the line of the called subscriber, means controlled by either of said subscribers for disconnecting said ringing current from said called subscriber's line, and automatic means controlled solely by the calling subscriber when said link circuit is interconnecting said lines for freeing said calling line from said link circuit.

7. A telephone system comprising telephone lines terminating in multiple jacks, an operator's link circuit having manually operated connection terminals for connecting said lines via said multiple jacks, means for intermittently applying ringing current to the called line, electromagnetic means controllable solely at the substation of the calling line for disassociating his line from the said link circuit, and means responsive to such disassociation for interrupting the application of ringing current to the line of said called subscriber.

8. A telephone system comprising a calling line and a called line, said lines terminating in multiple jacks, a link circuit for connecting said lines having manually operated terminal plugs for insertion into a pair of said jacks in connecting said lines, means included in said link circuit for automatically applying ringing current to the said called subscriber's line, electromagnetic means responsive only to a control exercised solely at the substation of the calling line for disassociating said calling line and said link circuit, and means controlled by said electromagnetic means for interrupting the application of ringing current to the called subscriber's line.

9. A telephone system comprising telephone lines terminating in multiple jacks, an operator's link circuit having manually controlled connection terminals for connecting said lines via said multiple jacks, means included in said link circuit for intermittently applying ringing current to the called line, a disconnect relay controlled solely over the calling subscriber's lines for disconnecting the calling subscriber's line from the link circuit, and means controlled by said disconnect relay for interrupting the application of ringing current to said called subscriber's line.

10. A telephone system comprising telephone lines having manual terminals, an operator's link circuit having a manually controlled connection terminal at each of its ends for interconnecting said lines via said manually operated terminals, means for intermittently applying ringing current to a called one of said lines, and means controlled solely at the substation of a calling one of said lines for disassociating his line from said link circuit and for interrupting such application of ringing current.

11. A telephone system comprising a pair of connected telephone lines as a calling and called line, manually operated terminals included in said connection at both the calling and called ends of said lines, means for applying ringing current to one of said lines, means controlled solely at the calling substation of said lines for disassociating said lines at a point other than said manually operated terminals and for interrupting the application of ringing current to the first one of said lines.

12. A telephone system comprising a pair of connected telephone lines as a calling and a called line, manually operated terminals included in said connection at both the calling and called ends of said lines, means for applying ringing current to one of said lines, means controlled solely at the calling substation of said lines for disassociating said lines at a point other than said manually operated terminals, and means controlled individually at the substations of both of said lines for interrupting such application of ringing current.

13. A telephone system comprising a pair of telephone lines terminating in multiple jacks, an operator's link circuit provided with manual connection terminals for connecting said lines via said multiple jacks, means included in said link circuit for applying ringing current to one of said connected lines, a disconnect relay controlled solely at the substation of the calling line for disassociating said last line and said link circuit, and means controlled by said disconnect relay for disconnecting the ringing current from the first one of said lines.

14. A telephone system including a calling and a called telephone line, an operator's link circuit for connecting said lines in conversational circuit, means for applying ringing current and continuing such application of the same to said called line, a pair of supervisory signals for said link circuit, and means controlled solely by the calling subscriber for interrupting such application of ringing current to the called line and for operating both of said supervisory signals, said last means also operable to free the calling line from said link circuit even though a physical connection remains between said calling line and said link circuit.

15. A telephone system including a calling subscriber's line and a called subscriber's line terminating in multiple jacks, an operator's link circuit having manually operated connection terminals for connecting said lines in conversational circuit via said multiple jacks, a source of ringing current, means for intermittently applying said ringing current to the said called line, an operator's switch for initiating the operation of said intermittent means, and means controlled solely by the calling subscriber for causing the cessation of said intermittent means, said second means also operable to free the calling line from said link circuit even though a physical connection remains between said calling line and said link circuit.

16. A telephone system including a calling subscriber's telephone line and a called subscriber's telephone line terminating in multiple jacks, an operator's link circuit having the connection plugs adapted to be inserted into said jacks for connecting said lines in conversational circuit, a source of ringing current, operator-controlled means for applying said ringing current to the line of the called subscriber, and means controlled solely by the calling subscriber for disconnecting said source of ringing current from said called subscriber's line, and also for freeing his line from said link circuit although a physical connection remains between said link circuit and said calling line.

17. A telephone system including a calling and a called subscriber's line terminating in connection terminals, an operator's link circuit having manually controlled connection terminals for connecting said lines in conversational circuit via said first connection terminals, a source of ringing current, means for intermittently applying said ringing current to the called subscriber's line, operator-controlled means for initiating the operation of said ringing means, and electromagnetic means controlled solely by the calling subscriber for preventing the intermittent application of ringing current to the called subscriber's line, and also for freeing his line from said link circuit although a physical connection remains between said link circuit and said calling line.

18. A telephone system including a calling subscriber's line and a called subscriber's line terminating in connection terminals, an operator's link circuit provided with a pair of manually operated terminals for connecting said lines via said connection terminals, a source of ringing current, operator-controlled means for connecting said ringing current to the said called subscriber's line, a relay controlled only over the calling subscriber's line, and means controlled solely by said relay for preventing a further application of ringing current to the said called subsciber's line and to free said calling line from said link circuit.

19. A telephone system including a calling subscriber's line and a called subscriber's line terminating in multiple jacks, an operator's cord circuit having manually operated plugs adapted to engage a pair of said multiple jacks for connecting said lines, a source of ringing current, means for intermittently applying said ringing current to the called subscriber's line, operator-controlled means for initiating the operation of said applying means, and means controlled solely by the replacement of the receiver at the calling substation for preventing said applying means for further connecting ringing current to the called subscriber's line and for automatically freeing said calling line from said cord circuit.

20. A telephone system including a calling subscriber's line and a called subscriber's line, an operator's cord circuit for connecting said lines, a source of ringing current, means for intermittently applying said ringing current to the called subscriber's line, operator-controlled means for initiating the operation of said applying means, an answering supervisory signal, and a relay controlled solely by the calling subscriber when he signals for disconnection for operating said supervisory signal and for preventing the further application of said ringing current to said called subscriber's line and also for automatically freeing said calling line from said link circuit.

21. A telephone system including a calling subscriber's telephone line and a called subscriber's telephone line, means provided with manual terminals for connecting said lines, ringing mechanism including a relay adapted to be energized intermittently to apply ringing current to the called subscriber's line, means controlled by a central office operator for associating said mechanism with the said called subscriber's line, and automatic means controlled by the calling subscriber for disassociating said ringing mechanism from the said called subscriber's line thereby preventing further intermittent applications of ringing current to the called subscriber's line.

22. A telephone system including a calling subscriber's telephone line and a called subscriber's telephone line terminating in multiple jacks, an operator's link circuit provided with manually operated connection plugs adapted to be inserted into a pair of said multiple jacks for connecting said lines, a source of ringing current, a relay adapted to be operated intermittently to connect said ringing current to said called subscriber's line, a ringing control relay controlling the operation of said first relay, means for operating said ringing control relay to initiate the operation of said first relay, and electromagnetic means controlled by the calling subscriber for deenergizing said ringing control relay to prevent further operation of said first relay, thereby preventing further intermittent applications of ringing current to the said called subscriber's line.

23. In combination with a calling telephone line, a plurality of connecting terminals for the line located at operators' positions of a central office switchboard, a line signal for the line, a cut-off relay controlling the line signal, operators' link circuits having associated operators' telephones and including means effective when one of the link circuits and associated operator's telephone is connected to one of the terminals whereby a second link circuit and operator's telephone is barred from operative connection with another of the terminals, a relay in the engaged link circuit controlled over the telephone line, a called telephone line, a source of ringing current, means for connecting the source of ringing current with the called line when the engaged link circuit is connected therewith, and circuit connections rendered effective by the line-controlled relay in response to the opening of the calling telephone line for causing the release of the cutoff relay and the disconnection of ringing current from the called line.

24. In a telephone exchange system, subscribers' lines terminating at a central office, a plurality of terminals, a plurality of link circuits for interconnecting the lines, an operator's telephone set adapted for connection with each link circuit, a relay associated with each link circuit operating upon connection thereof with a calling telephone line to control the inclusion of the operator's telephone set in circuit, means controlled by each relay and rendered effective by the operation thereof to prevent the operation of the relay of another link circuit when connected with the same line, a source of ringing current, a ringing relay for connecting the source of ringing current with a called line, an energizing circuit therefor, a local circuit relay energized upon the connection of the first link circuit with a called line to cause the release of the operator's telephone set and to close a contact in the energizing circuit of the ringing relay, a relay in the first link circuit controlled over the connected calling line, and circuit connections rendered effective by the line controlled relay in response to the opening of the calling telephone line to cause the release of the ringing relay whereby ringing current is disconnected from the called line.

Signed by me at Chicago, in the county of Cook and State of Illinois, this 27th day of February, 1920.

FRED SCHOENWOLF.